US005517025A

United States Patent [19]

Wells et al.

[11] Patent Number: 5,517,025

[45] Date of Patent: May 14, 1996

[54] FREQUENCY MODULATED SELECTED ION SPECIES ISOLATION IN A QUADRUPOLE ION TRAP

[76] Inventors: Gregory J. Wells, 3011 Beechwood Ct.; Charles K. Huston, 105 Cherry Valley Ct., both of Fairfield, Calif. 94533

[21] Appl. No.: 436,993

[22] Filed: May 8, 1995

Related U.S. Application Data

[60] Division of Ser. No. 297,680, Aug. 29, 1994, which is a continuation-in-part of Ser. No. 179,844, Jan. 11, 1994, Pat. No. 5,457,315, which is a continuation-in-part of Ser. No. 890,996, May 29, 1992, Pat. No. 5,302,826.

[51] Int. Cl.[6] .............................. B01D 59/44; H01J 49/40

[52] U.S. Cl. .............................. 250/282; 250/292

[58] Field of Search .............................. 250/282, 292

[56] References Cited

U.S. PATENT DOCUMENTS 5,381,007 1/1995 Kelley .............................. 250/282
5,396,064 3/1995 Wells .............................. 250/282
5,420,425 5/1995 Bier et al. .............................. 250/292
5,449,905 9/1995 Hoekman et al. .............................. 250/292

*Primary Examiner*—Bruce C. Anderson
*Attorney, Agent, or Firm*—Edward Berkowitz; David Schnapf

[57] ABSTRACT

A method of isolating selected ion species in a quadrupole ion trap mass spectrometer is disclosed. One or more ranges of masses to be eliminated from the ion trap are ejected by applying a supplemental dipole excitation waveform, sparsely populated with frequency components, while the trapping field is modulated. The spacing of the frequency components in the supplemental excitation waveform varies across the range of frequencies in the waveform. Preferably, the frequency range is divided into a plurality of subranges, and the spacing of the frequency components in each of the subranges is constant. A method of creating a master set of frequencies used for generating a supplemental excitation waveform is also shown. Likewise, a method of calculating edge frequencies defining a gap in the mass spectrum that is excited by the supplemental waveform is also shown. Modulation of the trapping field may be varied while the supplemental excitation waveform is applied to change the width of the gap in the mass spectrum.

4 Claims, 6 Drawing Sheets

FREQUENCY MODULATED SELECTED ION SPECIES ISOLATION IN A QUADRUPOLE ION TRAP

RELATED APPLICATION

This application is a division, of application No. 08/297,680, filed Aug. 29,1994, which is a continuation-in-part of the commonly assigned U.S. patent application Ser. No. 08/179,844, filed Jan. 11, 1994, now U.S. Pat. No. 5,452,315 the disclosure of which is incorporated by reference, which was a continuation-in-part of Ser. No. 7/890,996 filed May 29, 1992, now U.S. Pat. No. 5,302,826.

FIELD OF THE INVENTION

The present invention is related to methods of using quadrupole ion trap mass spectrometers, and is particularly related to methods of isolating selected ion species within such devices.

BACKGROUND OF THE INVENTION

The present invention relates to methods of using the three-dimensional quadrupole ion trap mass spectrometer ("ion trap") which was initially described by Paul, et al.; see, U.S. Pat. No. 2,939,952. In recent years, use of the ion trap mass spectrometer has grown dramatically, in part due to its relatively low cost, ease of manufacture, and its unique ability to store ions over a large range of masses for relatively long periods of time. This latter feature makes the ion trap especially useful in isolating and manipulating individual ion species, as in a so-called tandem MS or "MS/MS" or MS" experiment where a "parent" ion species is isolated and fragmented or dissociated to create "daughter" ions, which may then be identified using traditional ion trap detection methods or further fragmented to create granddaughter ions, etc.

Isolation of individual ion species also has importance in other applications beside isolation of parent ions for MS/MS experiments. Given the relatively low cost and sensitivity of present-day commercial ion traps, they can be used to monitor for the presence of specific compounds or groups of related compounds, e.g., monitoring for the release of toxic gases in an production area. Controlling an ion trap to selectively isolate specific ion species of interest can be used to optimize the sensitivity of the trap for the selected species, which otherwise would be poorly detectable or completely undetectable. In this regard, it is noted that one of the drawbacks of the ion trap is its limited dynamic range and sensitivity to the space charge created by the ions trapped within the device. Thus, the presence of a substantial number of ions in the trap, other than the ions of interest, can substantially degrade the sensitivity of the trap to the ions of interest. In order to optimize sensitivity to the ions of interest, it is best to rid the trap of the other ion masses.

The quadrupole ion trap comprises a ring-shaped electrode and two end cap electrodes. Ideally, both the ring electrode and the end cap electrodes have hyperbolic surfaces that are coaxially aligned and symmetrically spaced. By placing a combination of AC and DC voltages (conventionally designated "V" and "U", respectively) on these electrodes, a quadrupole trapping field is created. A trapping field may be simply created by applying a fixed frequency (conventionally designated "f") AC voltage between the ring electrode and the end caps to create a quadrupole trapping field. The use of an additional DC voltage is optional, and in commercial embodiments of the ion trap a DC trapping voltage is not normally used. It is well known that by using an AC voltage of proper frequency and amplitude, a wide range of masses can be simultaneously trapped.

The mathematics of the quadrupole trapping field created by the ion trap are well known and were described in the original Paul, et al., patent. For a trap having a ring electrode of a given equatorial radius $r_0$, with end cap electrodes displaced from the origin at the center of the trap along the axial line r=0 by a distance $Z_0$, and for given values of U, V and f, whether an ion of mass-to-charge ratio (m/e, also frequently designated m/z) will be trapped depends on the solution to the following two equations:

$$a_z = \frac{-16eU}{m(r_0^2 + 2z_0^2)\omega^2} \quad \text{Eq. 1}$$

$$q_z = \frac{+8eV}{m(r_0^2 + 2z_0^2)\omega^2} \quad \text{Eq. 2}$$

where $\omega$ is equal to $2\pi f$.

Solving these equations yields values of $a_z$ and $q_z$ for a given ion species having the selected m/e. If the point $(a_z q_z)$ maps inside the well-known stability envelop for the ion trap, the ion will be trapped by the quadrupole field. If the point $(a_z, q_z)$ falls outside the stability envelop, the ion will not be trapped and any such ions that are introduced within the ion trap will quickly move out of the trap. By changing the values of U, V or f one can affect the stability of a particular ion species. Note that from Eq. 1, when U=0, (ie., when no DC voltage is applied to the trap), $a_z$=0.

(It is common in the field to speak of the "mass" of an ion as shorthand for its mass-to-charge ratio. As a practical matter, most of the ions in an ion trap are singly ionized, such that the mass-to-charge ratio is the same as the mass. For convenience, this specification adopts the common practice, and generally uses the term "mass" as shorthand to mean mass-to-charge ratio.)

Each ion in the trapping field has a "secular" frequency which depends on the mass of the ion and on the trapping field parameters. As is well-known, it is possible to excite ions of a given mass that are stably held by the trapping field by applying a supplemental dipole voltage to the ion trap having a frequency equal to the secular frequency of the ion mass. Ions in the trap can be made to resonantly absorb energy in this manner. At relatively low voltages, a supplemental dipole voltage can be used to cause ions of a specific mass to resonate within the trap, undergoing dissociating collisions within molecules of a background gas in the process. This technique, called collision induced dissociation or "CID," is commonly used in MS/MS to dissociate parent ions to create daughter ions. At higher voltages, sufficient energy is imparted by the supplemental voltage to cause ions having a secular frequency matching the frequency of the supplemental voltage to leave the trap volume. This technique is now commonly used to eliminate unwanted ions from the ion trap, and to eject ions from the trap for detection by an external detector.

The typical basic method of using an ion trap consists of applying an rf trapping voltage ($V_0$) to the trap electrodes to establish a trapping field which will retain ions over a wide mass range, introducing a sample into the ion trap, ionizing the sample, and then scanning the contents of the trap so that the ions stored in the trap are ejected and detected in order of increasing mass. Typically, ions are ejected through perforations in one of the end cap electrodes and are detected with an electron multiplier. More elaborate experiments, such as MS/MS, generally build upon this basic technique, and often require the isolation of specific ion masses, or ranges of ion masses in the ion trap.

Once the ions are formed and stored in the trap a number of techniques are available for isolating specific ions of interest. It is well-known that when the trapping field includes a DC component, the trapping field parameters (i.e., U, V and f) can be adjusted to isolate a single ion species, or a very narrow mass range, in the trap. A problem with this approach is that it is difficult to control the trapping field parameters with the high degree of precision, and it is difficult to calculate the precise combination of trapping field parameters needed to isolate a single mass or a narrow range of masses. Another problem is that most commercial ion traps do not have the ability to apply a DC trapping voltage, and adding this capability increases the amount and cost of the system hardware that is required. Moreover, it is noted that this method cannot be used to isolate multiple discontinuous masses. Finally, it is noted that the ions to be retained in the field will be near the edge of the stability boundary such that the trapping efficiency is not optimal, and may be rather poor.

U.S. Pat. No. 4,736,101 describes another method of isolating an ion for MS/MS experiments. According to the technique taught by the '101 patent, a trapping field is established to trap ions having masses over a wide range. This is done in a conventional manner, as was well known in the art. Next, the trapping field is changed to eliminate ions other than the selected ion of interest. To do this the rf trapping voltage applied to the ion trap is ramped so as to cause ions of low mass to sequentially become unstable and be eliminated from the trap. The ramping of the rf trapping voltage is stopped at the point at which the mass just below the ion of interest is eliminated from the ion trap. The '101 patent does not teach how to manipulate the trapping field to eliminate ions having a mass that is higher than the mass of interest when no DC trapping voltage is applied. After the contents of o the ion trap have been limited by the foregoing technique of changing the trapping voltage, the trapping voltage is relaxed so that, once again, ions over a broad range are trapped. Next, the parent ions within the ion trap are dissociated, preferably using CID, to form daughter ions. Finally, the ion trap is scanned by again ramping the quadrupole trapping voltage so that ions over the entire mass range sequentially become unstable and leave the trap.

The major deficiency of the method of the '101 patent is its failure to teach how to eliminate high mass ions from the trap without using a trapping field having a DC component. In addition, the technique of causing the low mass ions to be eliminated from the ion trap by instability scanning is also problematic. If $m_p$ is the mass to be retained in the trap, and the trapping field is manipulated to cause $m_{p-1}$ to become unstable, then $m_p$ will, at that point, be very close to the stability boundary. Again, this may cause the trapping efficiency for $m_p$ to be quite low, and requires precise control of the trapping voltage as it is ramped to eliminate unwanted low mass ions.

Another method of isolating an individual ion species in an ion trap is described in U.S. Pat. No. 5,198,665 (the '665 patent) issued to one of the present inventors and coassigned herewith. (The disclosure of the '665 patent is hereby incorporated by reference.) According to the '665 patent, masses lower than the mass to be retained ($m_p$) are first sequentially scanned out of the trap using resonance ejection. This has the advantage that $m_{p-1}$ can be eliminated from the trap while $m_p$ is far from the stability boundary. After the low mass ions are so eliminated, a broadband supplemental signal is applied to the trap to eliminate the higher mass ions. The trapping voltage may be reduced slightly while applying the supplemental broadband voltage to bring ions just above my into resonance. While this technique is capable of producing highly accurate results, it is somewhat complex and cannot be used to isolate multiple discontinuous masses from the ion trap. In addition, since high mass ions remain in the trap while the low mass ions are being eliminated, a significant space charge remains. Unless proper measures are taken, this space charge can interfere with the accuracy of experiments using the technique.

It is also known in the prior art to apply various types of supplemental broadband voltage signals to the ion trap to simultaneously eliminate multiple unwanted ion species from the trap. The prior an generally teaches use of (1) broadband signals that are constructed from discrete frequency components corresponding to the resonant frequencies of the unwanted ions; and (2) broadband noise signals that essentially contain all frequencies, such that they act on the entire mass spectrum, and which are filtered to remove frequency components corresponding to the secular frequency(ies) of the ions that are to be retained in the ion trap. In all of the known prior art methods, the trapping field is held constant while the supplemental broadband voltage is applied to the ion trap.

According to these prior art methods, in order to retain an single ion species in an ion trap, it is necessary to apply a supplemental voltage waveform which has a very large number of frequency components so that the waveform will excite all of the ions which may potentially be held in the trapping field, other than the ion mass(es) of interest. A typical ion trap sold by the assignee of the present invention covers a mass range of about 50–650 amu under normal trapping conditions. If, for the sake of discussion, we assume that there is a single frequency component required to excite each integer ion mass, then approximately 600 frequency components would be required to resonantly eject the entire mass spectrum. However, this number of frequency components would only excite ions having integer masses. If ions were present in the trap having multiple charge, (e.g., a doubly ionized molecule), the resulting value of the mass-to-charge ratio may not be an integer value. In addition, it is known that space charge in the trap can affect the secular frequency of the trapped ions, such that a frequency component, included in a supplemental waveform to excite a particular ion mass, would not work. Thus, as a practical matter, when using the prior art techniques to isolate a single ion mass, or a narrow range of ion masses, in an ion trap, there is a need to include a much larger number of frequency components.

For example, U.S. Pat. No. 5,256,875, suggests that thousands of frequency components should be used. The patent notes that the frequency spacing in the broadband excitation signal should be sufficiently small that the signal presents a substantially continuous band of frequencies to the physical system, and goes on to state that the width of a "notch" in the spectrum designed to allow a single ion mass to be retained in the trap, should be substantially less than 500 Hz at the low frequency end of the spectrum. This, in turn, requires that the frequency spacing in the areas on either side of the notch be even narrower. As a practical matter, however, this is not workable since it does not account for the fact that the secular frequency of ions in the trap varies with the space charge in the trap. As described below, the resonance width of ions can be substantially more than 500 Hz.

Neither the '875 patent, nor the other patents which teach the use of broadband excitation signals to eliminate en masse unwanted ions from the ion trap, adequately address the fact that the spacing of the secular frequencies of adjacent ion masses varies across the mass spectrum. For low masses, the secular frequencies of adjacent integer masses are far apart, whereas at high masses they are quite close. As a result, at low masses, if the ion of interest is not an integer mass, or if space charge or trapping field irregularities have caused a shift in the nominal secular frequency, there. is a risk that the mass will not be excited and eliminated. On the other hand, in the high mass range, a single frequency component may cause resonance of multiple mass values, in which case a narrow "notch" in the broadband signal might not be sufficient to ensure that a desired ion will be retained in the ion trap.

A disadvantage of the prior art, which relies on waveforms containing a very large number of frequency components, is the high power requirements associated with having each of the frequency components present at sufficiently high voltage levels to cause excitation of ions across the mass spectrum. This disadvantage exists both for noise signals and for constructed waveforms, i.e., waveforms in which the frequency components are predetermined either by direct frequency selection or by an algorithm, such as an inverse Fourier transform of a frequency domain excitation spectrum to create a time domain excitation waveform. In a constructed waveform, it is important to further control the phases of the frequency components to minimize the dynamic range of the excitation waveform. As the number of frequency components increases, the need for more elegant and time-consuming are needed to create a time domain signal with a reasonable dynamic range, i.e., a minimized peak-to-peak voltage. For example, the '875 patent teaches a rather complex and time-consuming iterative technique for generating a supplemental voltage waveform.

A further disadvantage of the prior art methods of using broadband signals to eliminate unwanted ions from an ion trap is the failure to address the fact that the resonance frequency and resonance width of the ions in the trap changes with the space charge in the trap and with the location that the trapped ions. occupy in the trap.

SUMMARY OF THE INVENTION

Accordingly, it is an object of the present invention to provide a method of using an ion trap mass spectrometer to isolate selected ions masses within the trap volume.

Another object of the present invention is to provide a method of using an ion trap mass spectrometer to isolate multiple discontinuous masses in an ion trap mass spectrometer while eliminating all other masses from the ion trap.

A further object of the present invention is to provide a method of constructing a supplemental voltage waveform which can be used in conjunction with the trapping field to simultaneously eliminate multiple unwanted masses from an ion trap mass spectrometer.

Yet another object of the present invention is to provide a method of constructing a supplemental waveform which can be used in conjunction with the trapping field to eliminate unwanted ions from an ions trap and which takes into account the variability of the spacing of secular frequencies across the mass spectrum.

Still another object of the present invention is to provide a method of determining the edge frequencies in a gap in a broadband supplemental voltage signal which can be used in conjunction with the trapping field to simultaneously eliminate multiple unwanted masses from an ion trap mass spectrometer.

A further object of the present invention is to provide a method of constructing a supplemental excitation waveform which can be used to eliminate all but selected ions from an ion trap, wherein the supplemental waveform is relatively sparsely populated with individual frequency components.

Another object of the present invention is to provide a method of isolating selected ion species in an ion trap which addresses the variability of the secular frequency of the selected ions and the variability of the resonance width of the selected ions.

These and other objects which will be apparent to those skilled in the art upon reading the present specification in conjunction with the attached drawings and the appended claims, are realized in the present invention comprising a method of eliminating unwanted ions from an ion trap mass spectrometer such that only ions of interest are retained in the ion trap. In its broad aspect, the present invention comprises establishing a trapping field in an ion trap which is capable of trapping ions in a first continuous mass range, each of the trapped ions having a secular frequency associated therewith, and eliminating unwanted ions from the ion trap by applying a supplemental dipole field to the ion trap while modulating the trapping field, wherein the supplemental dipole field comprises a plurality of frequency components, the spacing of the frequency components varying over the frequency range of the dipole voltage. Preferably, the frequency range of the dipole field is divided into a plurality of contiguous subranges, and the spacing of the frequency components within each subrange is substantially constant. Preferably, each of the frequency components is at least 1500 Hz apart. A specific method for generating a master set of frequency components for use in creating the supplemental excitation waveforms according to the present invention is described. Likewise, specific modulation waveforms are taught for modulating the trapping voltage according to the present invention.

In a further aspect, the present invention comprises a method of calculating the edge frequencies of the boundaries of a gap in a broadband supplemental voltage waveform used to eliminate unwanted ions from an ion trap, comprising the steps of determining the masses of the ions to be retained in the ion trap, determining the secular frequency of each mass at the upper and lower ends of the mass range, and determining an edge frequency for the end-range masses in a modulated trapping field. The foregoing methods may be repeated as necessary to allow multiple discontinuous masses to be isolated in the ion trap.

In yet another aspect, the modulation of the trapping field is varied during the time that the supplemental excitation waveform is applied. This is preferably accomplished by varying the peak-to-peak modulation of the AC trapping voltage from a first value, which is applied throughout the time ions are introduced into the ion trap, to second, greater value, thereafter.

DETAILED DESCRIPTION

Figure 3:
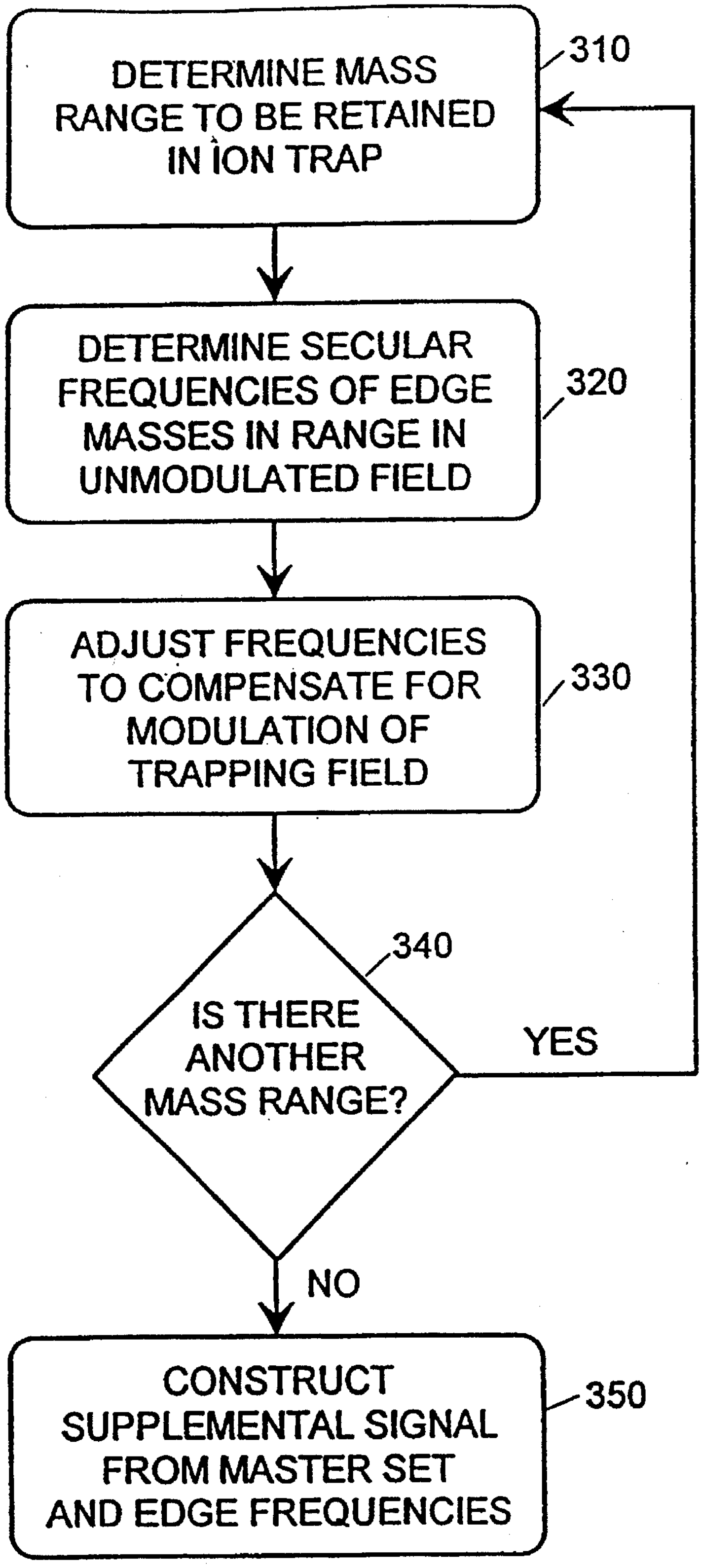
FIG. 3 is a flow chart of the method of constructing a supplemental voltage waveform in accordance with method of the present invention.

Apparatus of the type which may be used in performing the method of the present invention is shown in FIG. 3, and is well known in the art. Ion trap 10, shown schematically in cross-section, comprises a ring electrode 20 coaxially aligned with upper and lower end cap electrodes 30 and 35, respectively. These electrodes define an interior trapping volume. Preferably, the trap electrodes have hyperbolic inner surfaces, although other shapes, for example, electrodes having a cross-section forming an are of a circle, may also be used to create trapping fields that are adequate for many purposes. The design and construction of ion trap mass spectrometers is well-known to those skilled in the art and need not be described in detail. A commercial model ion trap of the type described herein is sold by the assignee hereof under the model designation "Saturn."

Sample, for example from gas chromatograph ("CGC") 40, is introduced into the ion trap 10. Since GCs typically operate at atmospheric pressure while ion traps operate at greatly reduced pressures, pressure reducing means (e.g., a vacuum pump and appropriate valves, etc., not shown) are required. Such pressure reducing means are conventional and well known to those skilled in the art. While the present invention is described using a GC as a sample source, the source of the sample is not considered a part of the invention and there is no intent to limit the invention to use with gas chromatographs. Other sample sources, such as, for example, liquid chromatographs with specialized interfaces, may also be used. For some applications, no sample separation is required, and sample gas may be introduced directly into the ion trap.

A source of reagent gas 50 may also be connected to the ion trap for conducting chemical ionization experiments. Sample and reagent gas that is introduced into the interior of ion trap 10 may be ionized by using a beam of electrons, such as from a thermionic filament 60 powered by filament power supply 65, and controlled by a gate electrode 67. The center of upper end cap electrode 30 is perforated to allow the electron beam generated by filament 60 and control gate electrode 67 to enter t,.he interior of the trap. In the preferred embodiment of the present invention, the hardware for creating and gating the electron beam is controlled by controller 70. When gated "on" the electron beam enters the trap where it collides with sample and, if applicable, reagent molecules within the trap, thereby ionizing them. Electron impact ionization of sample and reagent gases is also a well-known process that need not be described in greater detail. Of course, the method of the present invention is not limited to the use of electron beam ionization within the trap volume. Numerous other ionization methods are also well known in the art. For purposes of the present invention, the ionization technique used to introduce sample ions into the trap is generally unimportant.

Although not shown, more than one source of reagent gas may be connected to the ion trap to allow experiments using different reagent ions, or to use one reagent gas as a source of precursor ions to chemically ionize another reagent gas. In addition, a background gas is typically introduced into the ion trap to dampen oscillations of trapped ions. Such a gas may also be used for CID, and preferably comprises a species, such as helium, with a high ionization potential, i.e., above the energy of the electron beam or other ionizing source. When using an ion trap with a GC, helium is preferably also used as the GC carrier gas.

A trapping field is created by the application of an AC voltage having a desired frequency and amplitude to stably trap ions within a desired range of masses. RF generator 80 is used to create this field, and is applied to ring electrode 20. The operation of RF generator is, preferably, under the control of controller 70. A DC voltage source (not shown) may also be used to apply a DC component to the trapping field as is well known in the art. However, in the preferred embodiment, no DC component is used in the trapping field.

Controller 70 may comprise a computer system including standard features such as a central processing unit, volatile and non-volatile memory, input/output (I/O) devices, digital-to-analog and analog-to-digital converters (DACs and ADCs), digital signal processors and the like. In addition, system software for implementing the control functions and the instructions from the system operator may be incorporated into non-volatile memory and loaded into the system during operation. These features are all considered to be standard and do not require further discussion as they are not considered to be central to the present invention.

In the preferred method of scanning the contents of the trap, a supplemental AC voltage is applied across the end caps 30, 35 of ion trap 10 to create an oscillating dipole field supplemental to the quadrupole trapping field. (Sometimes the combination of the quadrupole trapping field and the supplemental rf dipole field is referred to as a "combined field.") In this scanning method, the supplemental AC voltage has a different frequency than the primary AC trapping voltage. The supplemental AC voltage causes trapped ions of specific mass to resonate at their secular frequency in the axial direction. When the secular frequency of an ion equals the frequency of the supplemental voltage, energy is efficiently absorbed by the ion. When enough energy is coupled into the ions of a specific mass in this manner, they are ejected from the trap in the axial direction where they are detected by detector 90. The technique of using a supplemental dipole field to excite specific ion masses is sometimes called axial modulation.

There are two ways of bringing ions of differing masses into resonance with the supplemental AC voltage: scanning the frequency of the supplemental voltage in a fixed trapping field, or varying the magnitude V of the AC trapping voltage while holding the frequency of the supplemental voltage constant. Typically, when using axial modulation to scan the contents of an ion trap, the frequency of the supplemental AC voltage is held constant and V is ramped so that ions of successively higher mass are brought into resonance and ejected. The advantage of ramping the value of V is that it is relatively simple to perform and provides better linearity than can be attained by changing the frequency of the supplemental voltage. The method of scanning the trap by using a supplemental voltage will be referred to as resonance ejection scanning.

In commercial embodiments of the ion trap using resonance ejection as a scanning technique, the frequency of the supplemental AC voltage is set at approximately one half of the frequency of the AC trapping voltage. It can be shown that the relationship of the frequency of the trapping voltage and the supplemental voltage determines the value of $q_z$ (as defined in Eq. 2 above) of ions that are at resonance.

Alternatively, the technique commonly referred to as mass instability scanning, described in U.S. Pat. No. 4,540,884, may be used to scan the contents of the ion trap. The '884 patent teaches scanning one or more of the basic trapping parameters of the quadrupole trapping field, i.e., U, V or f, to sequentially cause trapped ions to become unstable and leave the trap. The '884 patent teaches scanning a trapping parameter such that the unstable ions tend to leave in the axial direction where they can be detected using a number of techniques, for example, as mentioned above, a electron multiplier or Faraday collector connected to standard electronic amplifier circuitry. Nonetheless, resonance ejection scanning of trapped ions provides better sensitivity than can be attained using the mass instability technique taught by the '884 patent, and produces narrower, better defined peaks, i.e., resonance ejection scanning produces better overall mass resolution. Resonance ejection scanning also substantially increases the ability to analyze ions over a greater mass range.

In addition, methods based on the simultaneous ejection of contents of the trap by the application of a supplemental field as in a time-of-flight technique can be used. It will be also recognized by those skilled in the art that in-trap detection methods, such as those described in U.S. Pat. No. 5,105,081, or involving measurement of induced currents may also be used for determining the contents of ion trap 10 after an experiment. Whatever detection method is used, the data collected by the detector is, preferably, retrieved and processed by controller 70.

The flow from a GC is continuous, and a modem high resolution GC produces narrow peaks, sometimes lasting only a matter of seconds. In order to obtain a mass spectra of narrow peaks, it is necessary to perform at least one complete scan of the ion trap per second. The need to perform rapid scanning of the trap adds constraints which may also affect mass resolution and reproducibility. Similar constraints exist when using the ion trap with an LC or other continuously flowing, variable sample stream.

The supplemental dipole voltage used in resonance ejection scanning may be created by a supplemental waveform generator 100, coupled to the end cap electrodes by transformer 110. Supplemental waveform generator 100 is of the type which is not only capable of genera, ting a single supplemental frequency component for resonance ejection scanning, but is also capable of generating a voltage waveform comprising of a wide range of discrete frequency components. Any suitable arbitrary waveform generator, subject to the control of Controller 70, may be used to create the supplemental waveforms used in the present invention. According to the present invention, a multifrequency supplemental waveform created by generator 100 is applied to the end cap electrodes of the ion trap, while the trapping field is modulated, so as to simultaneously resonantly eject multiple ion masses from the trap. The inventive method of generating a supplemental signal for isolating selected ion species is described in detail below. Supplemental waveform generator 100 may also be used to create a low-voltage resonance signal to fragment parent ions in the trap by CID, as is well known in the art.

In prior methods of resonantly eliminating multiple ions from an ion trap using various types of broadband supplemental excitation signals, the supplemental signal is applied in a static trapping field. Under such circumstances, it is necessary to apply a supplemental broadband signal having a large number of frequency components, with as many as 1000 frequencies or more required to adequately span the entire mass range. The present invention uses a much different approach, such that far fewer frequency components can to used to span the entire mass range. In the presently preferred embodiment of the method of the present invention a supplemental excitation waveform having only 132 or fewer frequency components is used.

According to the inventive method, while the supplemental dipole voltage waveform is applied, one of the trapping field parameters is modulated. Since the secular frequency of an ion mass in a trapping field depends both on the mass of the ion and on the trapping field parameters, modulation of a trapping field parameter has the direct effect of modulating the secular frequency of the ion mass. A helpful way of looking at this is to view the modulation of the trapping field as sweeping the secular frequency of each ion in the trap over a range of values. This is effectively the equivalent of sweeping each supplemental frequency component over a range of values centered on the nominal value. Accordingly, modulation of the trapping field, in combination with a supplemental voltage waveform that is sparsely populated with frequency components is used, in accordance with the present invention, to eliminate multiple ions masses from the ion trap. These unwanted masses may lie in one or more ranges.

Figure 5:
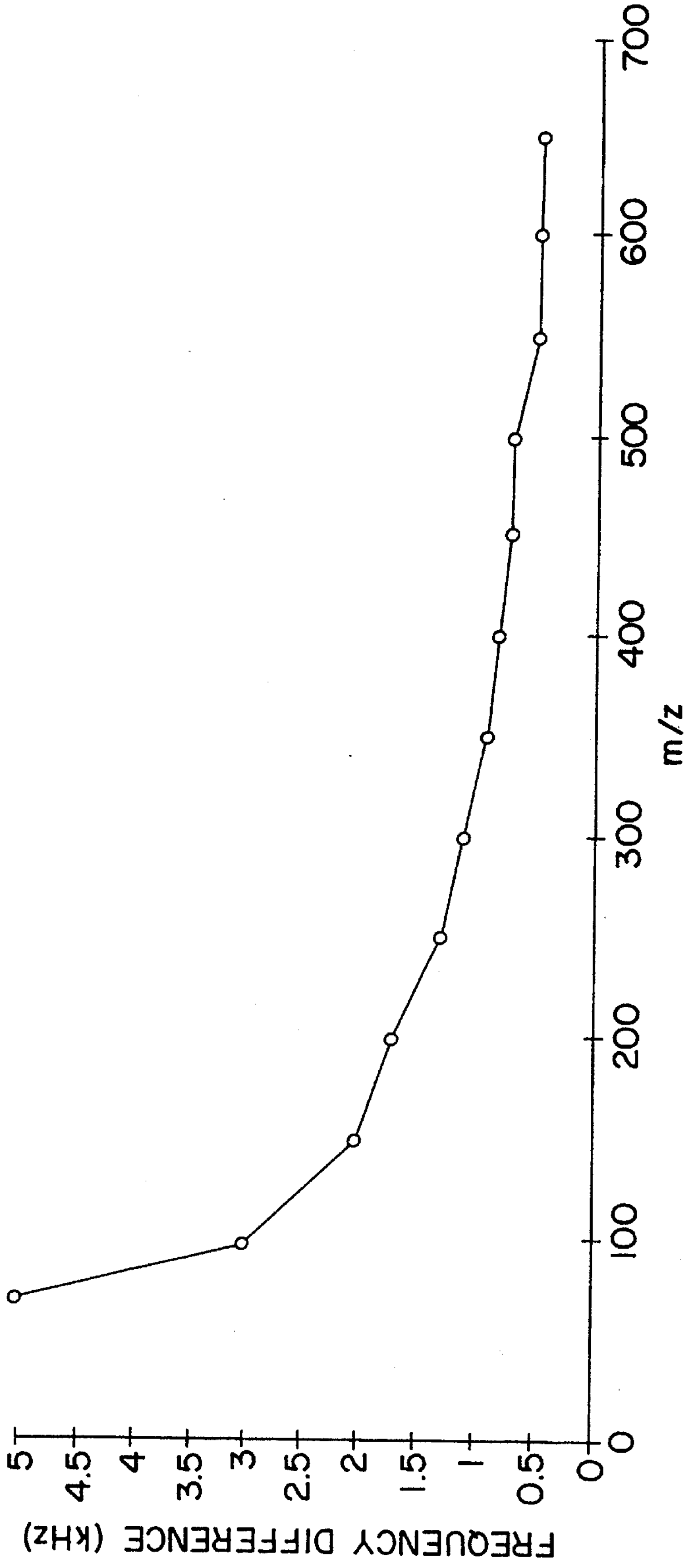
FIG. 5 is a graph showing the change in the secular frequency of an ion mass as a function of the mass number for a three percent change in the trapping field voltage.

Turning to FIG. 5, a graph is presented which shows the effect of modulation of the trapping field on the resonant frequency of masses (m/z's) over the normal mass range of a commercial embodiment of an ion trap. The data presented are for a three percent (3%) modulation of the trapping voltage about a nominal value $V_0$. While any of the trapping parameters, namely the magnitude of the trapping voltage V, the frequency of the trapping voltage f, or the magnitude of the DC component of the trapping field U (if any), can be varied to modulate the trapping field, as a practical matter it is easiest to vary the magnitude of V. Thus, in the preferred embodiment of the present invention, modulation of the trapping field involves periodically varying the magnitude of the trapping voltage from a high voltage of $V_H$ to a low voltage $V_L$, thereby defining a peak-to-peak voltage swing, $V_H-V_L$. As described below, it is not necessary that $V_H$ have the same offset from $V_0$ as does $V_L$, (i.e., $V_H-V_0$ need not equal $V_0-V_L$). FIG. 6 shows two sample modulation waveforms that may be used to modulate the trapping voltage about the nominal value $V_0$.

It will be seen from FIG. 5 that the effect produced by modulation of the trapping field on the secular frequency varies considerably over the mass spectrum. At high masses, a three percent variation in the trapping voltage causes the secular frequency of a given mass to vary by as little as 500 Hz, while at low masses, the same three percent modulation of the trapping field causes the secular frequency of a given ion mass to vary by as much as 5000 Hz or more. In one aspect of the present invention, in recognition this variability, the frequency spacing of the frequency components in a supplemental waveform generated to eliminate a range of masses from an ion trap varies across the frequency spectrum. In a preferred method according to the present invention, the supplemental frequency spectrum used to eliminate a range of masses is divided into a plurality of subranges and uses different but constant frequency spacing in the different subranges.

Figure 1:
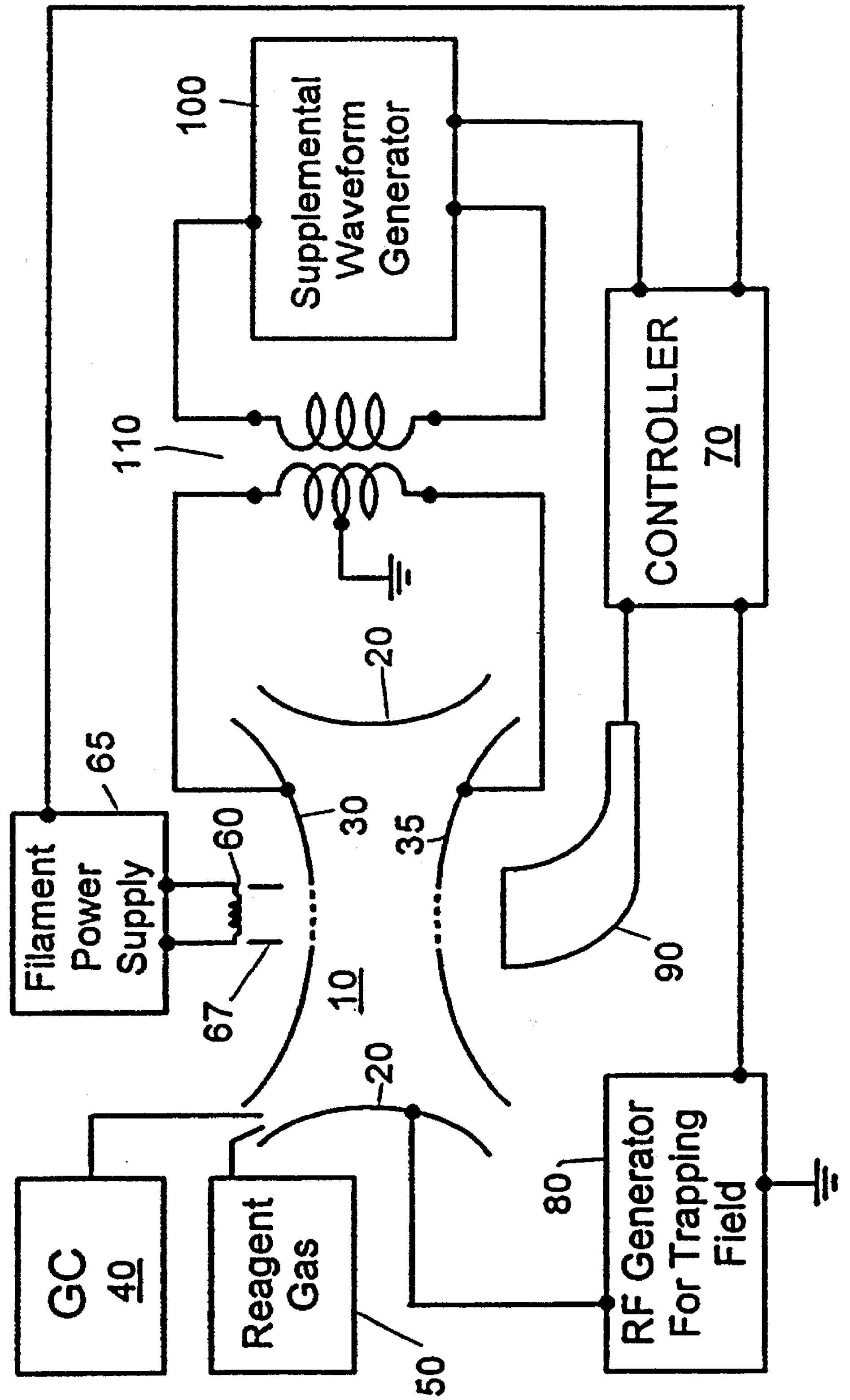
FIG. 1 is a partially schematic illustration of an ion trap mass spectrometer system of the type used to practice the methods of the present invention.
Figure 2:
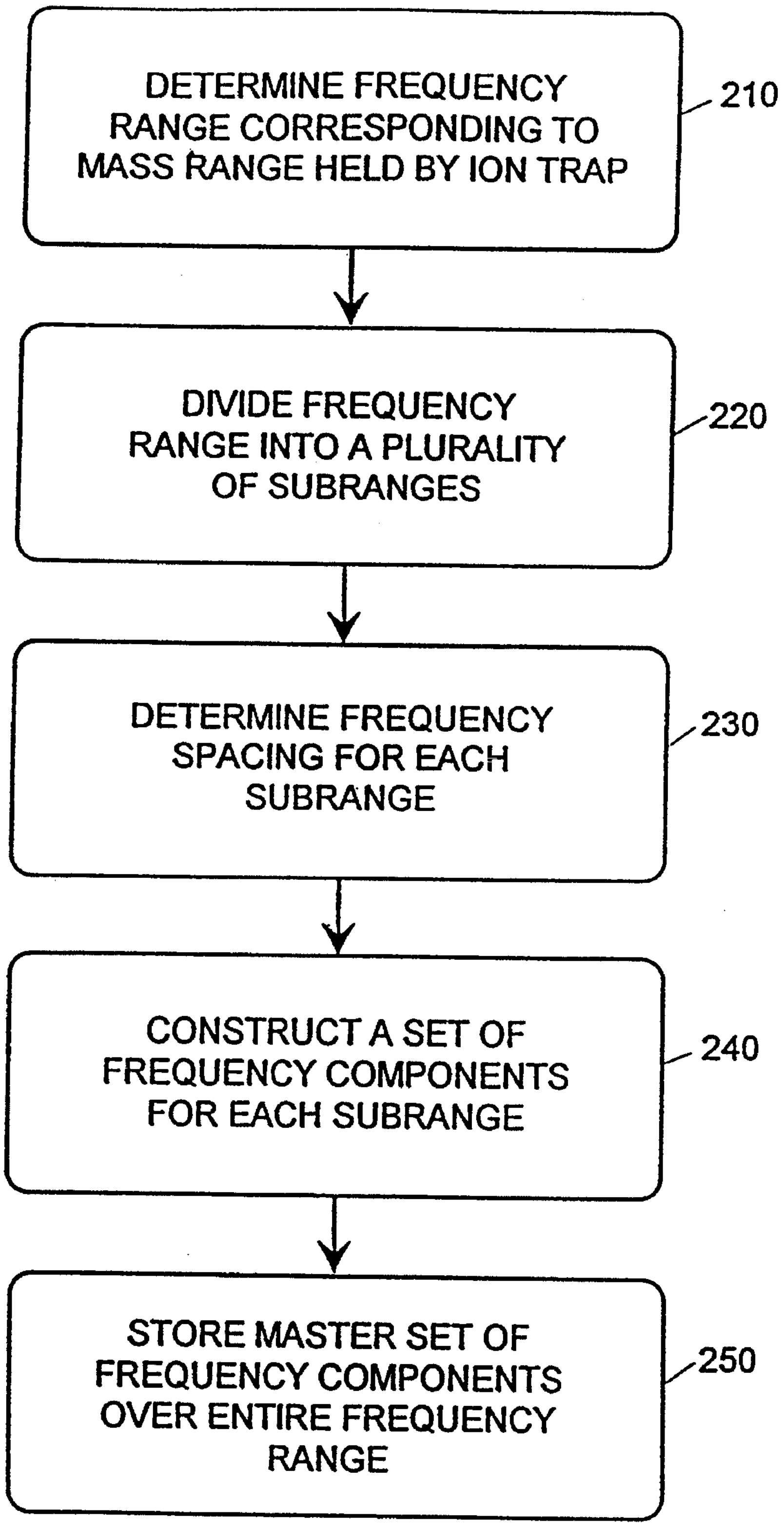
FIG. 2 is a flow chart of the method of the constructing a master frequency set in accordance with the present invention.

FIG. 2 is a flow chart showing how a master set of frequency components can be generated to excite all ions in an ion trap. This master set of frequency components may be used to create a supplemental voltage waveform as described below. Starting a block 210, it is first necessary to know the mass range that can be held in the trap when the nominal trapping voltage $V_0$ is applied, and then determine the range of secular frequencies that correspond to this mass range. For example, a typical ion trap sold by the assignee of the present invention can store ions in the range of about 50–650 amu. (It is noted that a trapping field having only an AC trapping voltage has no upper limit to the masses that will be trapped in the field. As a practical matter, however, the trapping efficiency drops off dramatically at high masses, such that the number of very high mass ions retained in the trap can be ignored.) Under the typical trapping conditions comprising the application of $V_0$ to the trap, the mass range of 50–650 amu corresponds to a secular frequency range of 25–420 kHz, with the high masses having the low secular frequencies and vice versa. This overall frequency range is then divided into contiguous subranges (step 220), and a frequency spacing is determined for each subrange (step 230). According to the preferred method of the present invention, the relationship depicted in FIG. 5 is used in determining the frequency spacing in the different subranges. In the presently preferred method, the first subrange spans the frequency range of 25–80 kHz, and frequency components are spaced apart by 1500 Hz. Thus, the first subrange includes frequency components at 20, 21.5, 23, 24.5, . . . , 78.5, and 80 kHz. The second subrange spans frequencies between 82–132 kHz, and includes frequency components spaced apart 2500 kHz, i.e., 82, 84.5, 87, . . . , 129.5 and 132 kHz. The third and fourth frequency ranges, 135–205 kHz and 210–420 kHz, comprise frequency components spaced 3500 and 4500 kHz apart, respectively. The selection of the frequency components for each subrange is identified in FIG. 2 at step 240. The complete set of frequency components, spanning all four frequency subranges, is then stored in the system memory or its equivalent (step 250).

While the method of FIG. 2 has been described in connection with the creation of a set of supplemental voltage frequencies that, when used in connection with modulation of the trapping field, can eliminate all ions over the entire mass spectrum from the ion trap, those skilled in the art will appreciate that the same method can be used to create a set of frequencies to resonantly eliminate all ions in a given mass range which is a subset of the total mass range of the trap. The present invention offers a significant advantage over prior art methods in that it uses far fewer frequency components in its supplemental signal. This significantly lowers the power of the supplemental voltage waveform and simplifies the task of generating, storing and and manipulating the waveform.

It will be noted that all of the frequency components in the master set of supplemental frequencies are multiples of 500 Hz. It is preferred that the frequency components all have a common factor so that a short, constructed waveform can be repeated multiple times without phase shift. Selection of the common factor depends on the clock frequency of the system and the number of data points required to define the waveform. For example, a waveform comprising a plurality of frequencies from the master frequency set lasting two (2) milliseconds can be constructed and stored in system memory. This waveform can then be repeatedly applied to the ion trap as a supplemental voltage signal thirty (30) times to provide an excitation lasting forty-five (45) milliseconds.

(It can be anticipated, however, that as the current trend in computer technology towards ever increasing speed and processing power continues, and with the prospect of the development of new highly specialized components, it will become feasible to generate and implement a multifrequency supplemental excitation waveform in real time. When this occurs, there will no longer be a need to rely on repetition of a short waveform stored in memory and therefore, the need to use a common factor for all frequency components will no longer exist. Moreover, even before real-time processing becomes available, these trends may permit the easy creation and storage of longer waveforms such that repetition of a short waveform segment is not required.)

Turning to FIG. 3, a flow chart is presented which shows how the method of the present invention can be used to create a supplemental voltage waveform to retain selected ion species in an ion trap. First, the mass range(s) to be retained in the ion trap are determined (step 310). For purposes of the present invention, there can be more than one mass range, and each mass range can include more than one mass value. Or, there may only be a single mass of interest to be retained in the ion trap. As used herein, each mass range comprises one or more contiguous mass values. For purposes of this discussion, a mass range $m_1$–$m_2$ will be considered. Next the secular frequencies of the masses at the upper and lower edges of the mass range are determined in an unmodulated trapping field (step 320), i.e., with the trapping voltage set at $V_0$. These values are designated $f_1$ and $f_2$ respectively. The values of $f_1$ and $f_2$ are then adjusted to compensate for the modulation of the trapping field and the resonance width of the ions in the trap, (step 330). The adjusted values of the edge frequencies are designated $f_{E1}$ and $f_{E2}$ respectively. In the case where $m_1=m_2$, i.e., only a single mass is to be retained in the trap, and, therefore, $f_1=f_2$, then $f_{E1}\neq f_{E2}$ since the adjustment of the frequencies depends on which edge of the frequency spectrum is involved. A preferred technique for adjusting the frequencies is described below in connection with FIG. 4. If more than one mass range is to be retained in the trap, the sequence of steps 310–330 is then repeated for each mass range (step 340). It will be appreciated by those skilled in the art that the edge frequencies will be used, as described below, to define gaps in the supplemental voltage waveform such that the resonant frequencies of the ions to be retained in the trap are missing over the entire range of trapping voltage modulation. After the edge frequencies for all of the mass ranges have been determined, a supplemental voltage waveform is constructed from the edge frequencies and the master set of frequencies described above in connection with FIG. 2 (step 350).

The preferred method of constructing the supplemental voltage waveform is as follows. First, all of the edge frequencies are added into the waveform. Next, each of the frequencies in the set of supplemental frequencies is compared to the values of the edge frequencies which, as described above, define one or more gaps in the frequency spectrum. (The set of frequencies will be denoted $f_i$ where i spans the range from 1 to, in our example; 132.) For each value of i, if the frequency $f_i$ lies within one of the gaps it is discarded. Otherwise, the frequency is added into the waveform. Thus, in the case where a single mass range is to be retained in the ion trap, defining edge frequencies $f_{E1}$ and $f_{E2}$, then each $f_i$ is added into the supplemental voltage signal which meets the criteria that $f_i<f_{E1}$ or $f_i>f_{E2}$.

As is known in the art, in order to minimize the dynamic range of the final waveform, the starting phase of the frequency components included in the final waveform is, preferably, controlled. In the presently preferred embodiment, the starting phase of each of the frequency components is randomly assigned. Other techniques are known in the art for assigning phases to the frequency components in a constructed supplemental voltage waveform, any of which can be used to produce satisfactory results. Since the present invention relies on far fewer frequency components than the prior art techniques which rely on constructed broadband signals, the need to control the phases of the frequency components is not as great. The final waveform segment, constructed in the foregoing manner, is then stored in memory for use in an experiment.

Alternatively, a master waveform can be generated from the master set of frequency components, and recorded in system memory. The phases of the frequency components in the master waveform can be assigned randomly or by any other suitable algorithm which minimizes the dynamic range of the final master waveform. The final waveform can be derived from this master waveform by adding the edge frequencies into it, and removing any frequencies that lie between the edge frequencies. Those skilled in the art will appreciate that the individual frequency components, the master waveform and the final applied waveform can all be digital and that the processing can conveniently be implemented through system software or a digital signal processor. Of course, means for generating and processing analog signals, and for converting analog signals to digital signals, and vice versa, are all well known in the art and may be used.

According to the present invention, the final waveform is used in connection with modulation of the trapping field, to eliminate one or more ranges of unwanted ions from the ion trap. Preferably, the ranges lie on either side of a mass, or range of masses, that are to be retained in the ion trap. There may be more than one discontinuous mass or range of masses to be retained, such that the supplemental waveform will cause elimination of three or more ranges of masses from the ion trap.

Figure 6A:
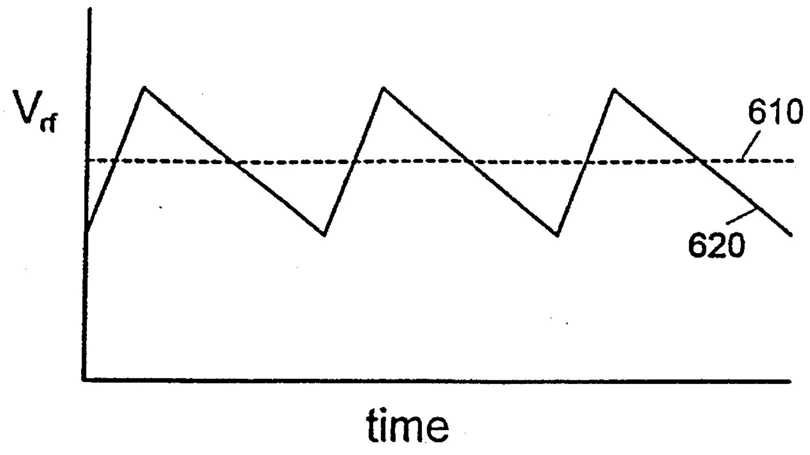
FIGS. 6a, 6b and 6c show alternative waveforms for modulating the trapping voltage in accordance with the present invention.
Figure 6B:
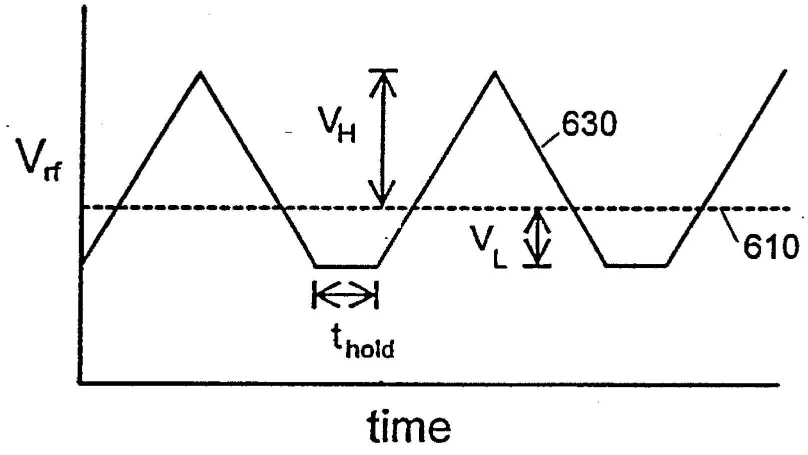
Figure 6C:
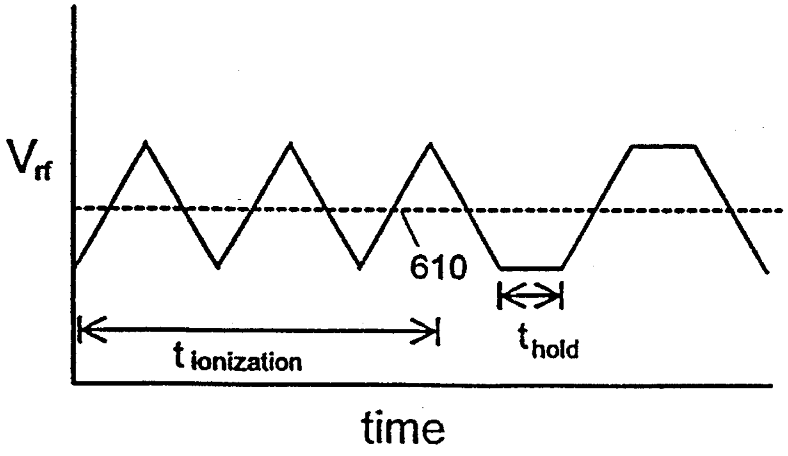

The supplemental excitation waveform is, preferably, applied to the end cap electrodes 30, 35 of the ion trap during ion introduction into the trap, for example, when the ionizing electron beam is gated on, and for a short time after ionization is complete. While the waveform is applied, the trapping field is modulated to vary the secular frequencies of the ions in the trap. Preferably, modulation of the trapping field is effected by modulating the rf trapping voltage about its nominal value $V_0$ from a high of $V_H$ to a low of $V_L$. A modulation waveform is applied to cause modulation of the trapping voltage. Sample modulation waveforms are shown in FIG. 6, and are described below in connection therewith. While FIG. 6 shows modulation waveforms that are specially constructed in accordance with further aspects of the present invention, other, simpler waveforms may also be applied. For example, the modulation waveform may be a simple sine wave. The presently preferred embodiment uses a modulation frequency of 500 Hz, and a modulation waveform resembling the waveform of FIG. 6*c*. In the waveform of FIG. 6*c*, a triangular wave is applied to the trap during the ionization period and for up to one cycle after the ionization period is over. Thereafter, an extra, user selected, dwell time $t_{hold}$ is added at the peaks of the "triangle."

In a refinement of the present invention, the amplitude of the frequency components in the different subranges is varied. It is known that the energy required to eject a high mass ion from an ion trap is less than the energy required to eject a low mass ion. In addition, using too large a voltage to eject ions has the adverse effect of degrading resolution. Thus, it is best to optimize the voltage of supplemental frequency components. In the presently preferred embodiment of the present invention, a constant but different voltage level is used for each of the four frequency subranges, with the voltage used for the lowest frequency components being about seventy percent (70%) of the voltage used for the highest frequency components. Of course, those skilled in the art will appreciate that the rather than use a constant value in each of the subranges, each individual frequency component, (or subsets of the various subranges) may be assigned different values.

Figure 4:
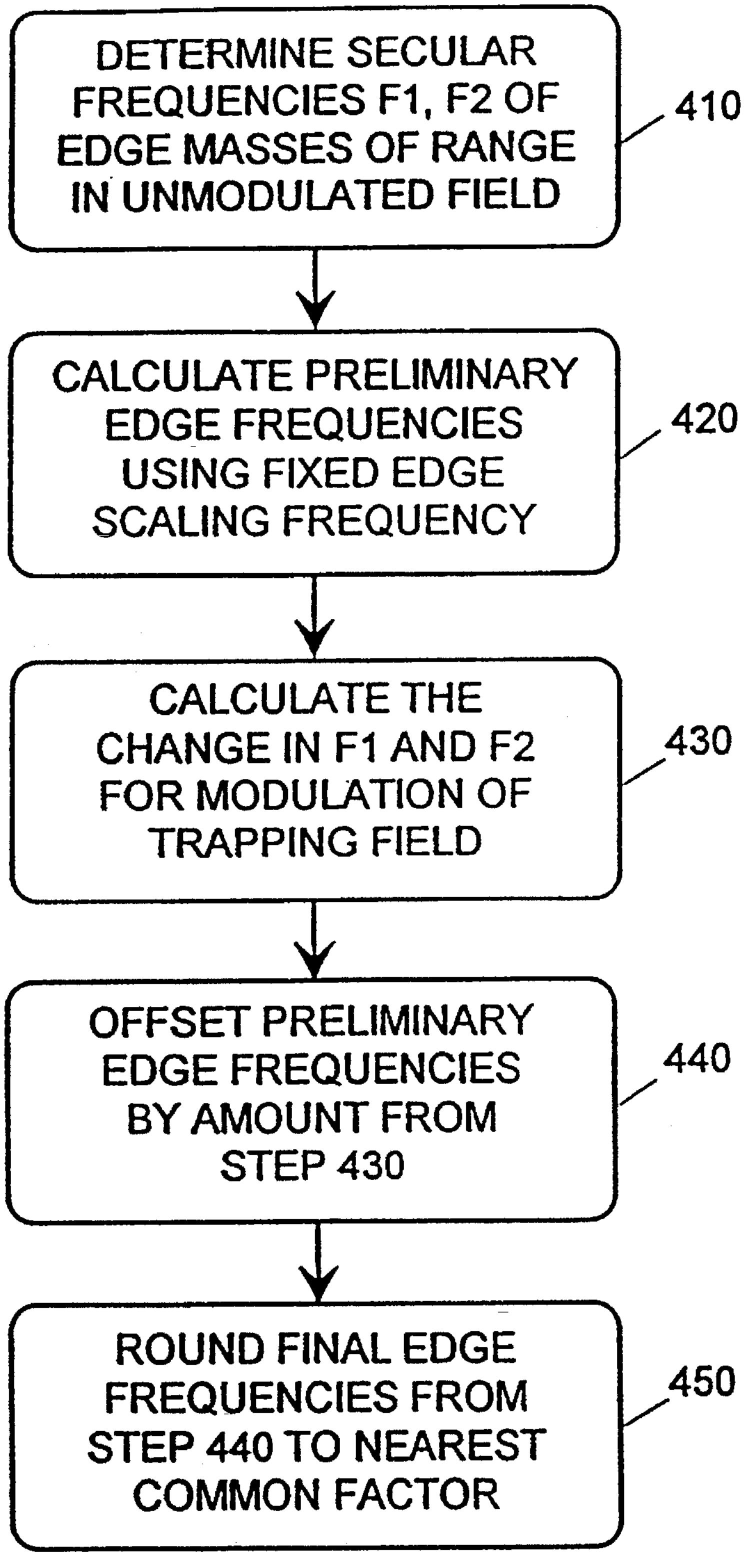
FIG. 4 is a flow chart of a method of adjusting edge frequency components in a supplemental voltage waveform to retain a mass range of interest according to the present invention.

Turning to FIG. 4, there is shown a flow chart of a preferred method of determining the final edge frequencies used in the method of FIG. 3. The method starts at step 410, which is the same as step 320 of FIG. 3, i.e., the nominal secular frequencies ($f_1$, $f_2$) of the masses ($m_1$, $m_2$) at the ends of the range of masses ($m_1$–$m_2$, where $m_1 \leqq m_2$) to be retained in the ion trap are determined for the unmodulated trapping voltage $V_0$. Next, preliminary edge frequencies ($f_{PE1}$, $f_{PE2}$) are calculated by adjusting the nominal secular frequencies by an edge scaling factor. The edge scaling factor $f_E$ is subtracted from the lowest frequency (corresponding to the high mass $m_2$) and added to the highest frequency (corresponding to the low mass $m_1$), i.e., $f_{PE1}=f_1+f_E$ and $f_{PE2}=f_2-f_E$.

The edge scaling factor is used in recognition of the fact that the masses in the ion trap have a finite resonance width, such that any given mass will absorb energy from a supplemental voltage not only matching its secular frequency, but also close in value to it. One way to view this is that if $m_1=m_2$, such that $f_1=f_2$, there still needs to be a gap in the frequency spectrum wider than a single frequency component. The present inventors have determined that the resonance width of ions of a given mass may be as wide as 1.0–1.5 kHz in the presence of significant space charge, and is relatively constant across the entire mass spectrum. Factors that cause the resonance width to be so large include the effects of space charge and imperfections in the trapping field. Space charge in the ion trap affects the secular frequency of the trapped ions and further affects the spatial distribution of the trapped ions. In effect, the presence of significant space charge can be viewed as being the equivalent of having a small DC trapping voltage (U) applied to the trap. Moreover, it is known that even the most carefully constructed ion traps have higher order field components (e.g., hexapole, ottopole, etc.), which vary with the position of an ion in the trap. Indeed, in some commercial ion traps, higher orders fields are intentionally introduced. These effects contribute to the broadening of the resonance widths of ions in the trap. Even if a signal is applied to the trap to eject unwanted ions that contribute to the creation of space charge, the ions are not instantaneously eliminated from the trap. Hence, until ionization is ceased and unwanted ions eliminated from the trap by action of a supplemental voltage signal, they will contribute to the space charge in the trap. Thus, the secular frequency of ions to be selectively stored in the trap, and their resonance width, will change throughout the ion formation and storage process. When a single ion species is stored at an optimal level in the trap, the resonance width may still be as wide as 500–800 Hz.

The prior art has generally failed to recognize these factors and has, instead, ignored the problems associated with the variability of the secular frequencies of ions and the variability of the resonance widths of the secular frequencies. Thus, many prior art patents describe the use of frequency gaps or "notches" in a broadband signal that are very narrow. However, in the presence of any significant space charge, a single waveform comprising a broadband excitation with a frequency notch will be non-optimal because the central frequency of the notch and the notch width will not always match the secular frequency and resonance width of the target ion. A portion of the target ions, having secular frequencies that are shifted due to space charge and the effects of higher order field components, will be ejected by the broadband signal. The secular frequency of the target ions will generally not approach the central frequency of the frequency notch until most of the space charge in the trap has been eliminated and the ions of interest occupy orbits near the center of the trap where the effects of higher order fields are minimal. Preferably, the edge scaling factor, will be approximately equal to the resonance width at half height which is about 1500 Hz, at least during the initial application of the supplemental excitation waveform. As described below, the effective notch width may be reduced for a portion of the time that the supplemental waveform is applied to the trap, i.e., after ionization is complete. This may be viewed as effectively reducing the edge scaling factor.

Returning to a discussion of FIG. 4, after adjusting the edge frequencies by the edge scaling factor (step 420), the edge frequencies are further adjusted to take into account the fact that the trapping voltage is being modulated between a high voltage $V_H$ and a low voltage $V_L$. This further adjustment comprises two steps, 430 and 440. In step 430, the change in the secular frequency ($\Delta_1$) for the low mass ion ($m_1$) is calculated by determining the difference between the secular frequency of $m_1$ at the nominal trapping voltage $V_0$ and the highest value of the modulated trapping voltage ($V_H$), and the change in the secular frequency ($\Delta f_2$) for the high mass ion ($m_2$) is calculated by determining the difference between the secular frequency of $m_2$ at the nominal trapping voltage $V_0$ and the lowest value of the trapping voltage ($V_L$). Next, (step 440) the preliminary edge frequencies are adjusted by the amounts calculated in step 430, i.e., $f_{E1}=f_{PE1}-\Delta_1$ and $f_{E2}=f_{PE2}+\Delta f_2$. These values are referred to as the final edge frequencies. Preferably, however, the values are rounded to the nearest frequency which meets the criterion of having a common factor with the frequencies in the master frequency set (step 450). The process in FIG. 4 is repeated for each range of masses to be selectively stored.

In a further refinement to the method of the present invention, the amplitudes of the final edge frequencies are scaled downward to further alleviate the problem associated with the relatively large resonance width of the ions to be retained in the trap. Depending on the shape of the modulation voltage waveform, as the trapping voltage is modulated, the final edge frequencies may spend a significant time interval as the trapping voltage approaches and reaches the end points of its modulation, i.e., as it reaches its respective peak value and reverses direction. Thus, the combined field conditions which resonate ions adjacent at the high and low ends of the mass range to be retained in the trap may have the longest dwell time. Energy that is resonantly coupled to the ions high and low end may have a relatively long time in which to cause the unwanted ejection of these desired ions. By reducing the voltage of the edge frequency components, this problem can be mitigated.

In yet another refinement to the method to the present invention, the combined field is varied over time as the resonant frequency and the resonance width of the ions in the trap varies. For example, the steps of ion ejection and isolation is performed in two steps. In the first step a wide effective notch width is used during the ion formation or ion injection process and for a short period of time thereafter. This first step removes most of the space charge from the trap and allows the remaining ions to occupy the center of the trap where the effects of higher order trapping fields are greatly reduced. The resonance width of the remaining ions in the trap is also, thereby, substantially reduced, and the secular frequency of the remaining ions is closer to or centered on their respective nominal secular frequency(ies). During the second step the effective notch width is reduced to increase the resolution of ion isolation. This two-step process may conveniently be implemented by simply increasing the peak-to-peak modulation range of the trapping voltage from a first level, applied during the first step, to a second, greater level applied during the second step. In this regard, it is again noted that modulating the trapping voltage is effectively the same as sweeping each supplemental voltage component over a range of values, and that increasing the amount of modulation increases the effective sweep. Thus, increasing the modulation voltage effectively increases the sweep of the edge frequencies in the supplemental voltage waveform, thereby narrowing the gap between them. In addition, the magnitude of the supplemental voltage waveform can be applied at a higher level during the first period and at a lower level during the second period.

Of course, alternative ways of varying the combined trapping/supplemental field will be apparent to those skilled in the art. For example, rather than using two distinct values of trapping voltage modulation, the modulation of the trapping voltage can be ramped up over time. In one alternate embodiment, ramping of the trapping field is commenced at or near the end of the ionization period, (i.e., a constant peak-to-peak modulation is used throughout all or most of the ionization period, and is slowly ramped up after ionization is fully or nearly complete). Likewise, although presently less preferred because it is more difficult to implement, the edge frequencies and/or their magnitudes can be varied over the time period during which the supplemental voltage waveform is applied with constant or varying trapping field modulation.

Yet another refinement of the present invention may be implemented to address the well known fact that in ion traps having higher order multipole components added to the quadrupole field, approaching the resonance between the secular frequency of a trapped ion and a frequency component of a supplemental waveform by increasing the rf trapping voltage is not equivalent to-approaching the resonance by decreasing the trapping voltage. Two methods of addressing this asymmetry are shown in FIGS. **6*a* and 6*b*. FIG. 6*a* shows a sawtooth waveform 620 which may be used to modulate the trapping voltage about the nominal trapping voltage $V_0$ 610. Waveform 620** increases the trapping voltage $V_{rf}$ rapidly from low to high voltage, and decreases it relatively more slowly. In the waveform shown, the time its takes to increase the trapping voltage from low to high is about one half the amount of time it takes to decrease the trapping voltage from high to low.

In the waveform 630 of FIG. **6*b*, the waveform is not symmetrical about the nominal voltage $V_0$ (610), such that the high peak voltage does not equal the low peak voltage, (i.e., $V_0-V_L \neq V_H-V_0$). While the peak voltage during the downward modulation of the trapping field is reduced in the waveform of FIG. 6*b***, the period of time during which the trapping voltage is reduced below $V_0$ is the same at the period during which the trapping field is increased because of the insertion of a period $t_{hold}$.

As with most any instrument of its type, it is known that the dynamic range of an ion trap is limited, and that the most accurate and useful results are attained when the trap is filled with the optimal number of ions. If too few ions are present in the trap, sensitivity is low and peaks may be overwhelmed by noise. If too many ions are present in the trap, space charge effects can significantly distort the trapping field, and peak resolution can suffer.

The prior art has addressed this problem by using a so-called automatic gain control (AGC) technique which aims to keep the total charge in the trap at a constant level. In particular, prior art AGC techniques use a fast "prescan" of the trap to estimate the charge present in the trap, and then use this prescan to control a subsequent analytical scan. According to the present invention, a prescan may also be used to control space charge and optimize the contents of the trap for an analytical scan. During the prescan the same supplemental waveform as described above is applied to the trap so that the ionization time during a supplemental analytical scan can be optimized to fill the trap for the species of interest.

Accordingly, it will be understood by those skilled in the art that the present invention offers: (1) a simple method of constructing a supplemental excitation waveform for use in conjunction with trapping field modulation to selectively store desired ions and to eject unwanted ions; (2) a method of constructing such a waveform which minimizes the number of frequency components in the excitation waveform; (3) a method of creating a combined trapping and excitation field in an ion trap which defines a range of masses retained in the trap, wherein the effective width of the range of masses is variable; (4) a method of varying the modulation of a trapping voltage such that space charge effects can be mitigated; and (5) a method of field modulation that compensates for the asymmetry that exists when approaching the resonance of an ion from different directions.

While the present invention has been described in connection with the preferred embodiments thereof, those skilled in the art will recognize other variations and equivalents to the subject matter described. Therefore, it is intended that the scope of the invention be limited only by the appended claims.

What is claimed is:

1. A method of selectively storing ions in an ion trap, comprising the steps of:

applying a trapping field to the ion trap, applying a supplemental excitation waveform having multiple frequency components to the ion trap, the trapping field and the supplemental excitation waveform forming a combined field, the combined field effectively defining a frequency notch corresponding to the secular frequencies of the ions to be selectively stored in the ion trap, controlling the combined field to vary the width of the frequency notch during the time the supplemental excitation waveform is applied to the ion trap, said step of controlling comprising altering at least one frequency component of said supplemental excitation waveform.

2. The method of claim 1 wherein the width of the frequency notch is reduced during the time the supplemental exitation waveform is applied to the ion trap.

3. The method of claim 1 wherein said step of altering comprises changing the frequency of said at least one said frequency component.

4. The method of claim 1 wherein said step of altering comprises changing the amplitude of any respective said frequency components.

* * * * *